United States Patent [19]

Hassenrück et al.

[11] Patent Number: 5,646,257
[45] Date of Patent: Jul. 8, 1997

[54] AZODYESTUFFS, THEIR PREPARATION AND THEIR USE

[75] Inventors: Karin Hassenrück, Düsseldorf; Karl-Heinz Reinhardt, Leverkusen; Peter Wild, Odenthal; Klaus Wunderlich, Leverkusen, all of Germany

[73] Assignee: Bayer Aktiengesellschaft, Leverkusen, Germany

[21] Appl. No.: 342,295

[22] Filed: Nov. 18, 1994

[30] Foreign Application Priority Data

Nov. 26, 1993 [DE] Germany ............... 43 40 354

[51] Int. Cl.⁶ .................................................. C09D 11/00
[52] U.S. Cl. ..................... 534/689; 534/691; 534/796; 534/806
[58] Field of Search ........................ 534/689, 691, 534/796, 806

[56] References Cited

U.S. PATENT DOCUMENTS

| | | | |
|---|---|---|---|
| 4,752,337 | 6/1988 | Kunde | 106/22 |
| 4,804,411 | 2/1989 | Eida et al. | 106/22 |
| 5,203,912 | 4/1993 | Greenwood et al. | 106/22 K |

FOREIGN PATENT DOCUMENTS

| | | |
|---|---|---|
| 233769 | 2/1987 | European Pat. Off. . |
| 356080 | 8/1989 | European Pat. Off. . |
| 61-261377 | 11/1986 | Japan . |
| 63-317569 | 12/1988 | Japan . |

OTHER PUBLICATIONS

Derwent Abstract, J63317569, "Ink for ink jet recording" Dec. 26, 1988.
Chemical Abstracts, 106:178101d (1987).

*Primary Examiner*—Jacqueline Haley
*Attorney, Agent, or Firm*—Sprung Horn Kramer & Woods

[57] ABSTRACT

The new dyestuffs of the formula (I)

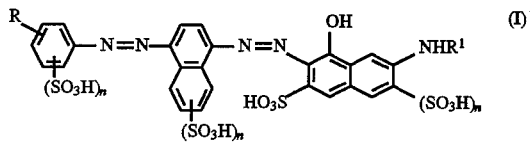

wherein the substituents R and $R^1$ and the index n have the meaning given in the description, are outstandingly suitable for dyeing and printing cellulose-containing materials, in particular for the preparation of recording liquids for ink jet recording systems.

8 Claims, No Drawings

AZODYESTUFFS, THEIR PREPARATION AND THEIR USE

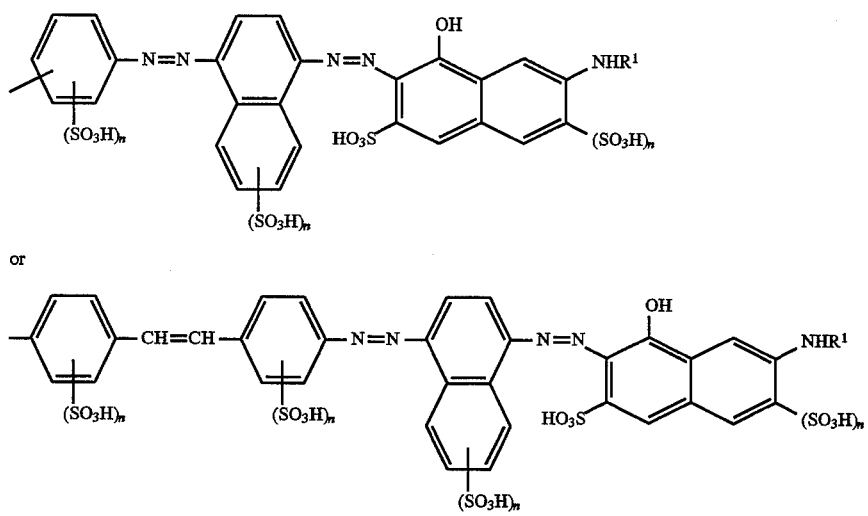

The invention relates to new azodyestuffs, a process for their preparation and their use. Black dyestuffs are already known from US-A 4 752 337 or EP-A-35 60 80. However, it was appropriate to improve them in respect of their performance properties.

The invention relates to azodyestuffs of the general formula

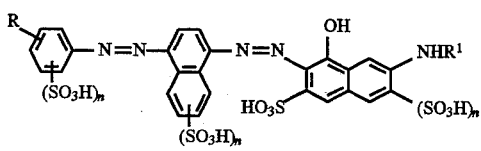

wherein
R represents $NHR^2$, $NHR^3$, $OR^3$, $SR^3$, —CH=CH—$R^3$, —$CH_2$—$CH_2$—$R^3$ or

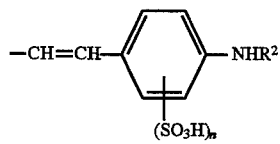

$R^1$ represents hydrogen, optionally substituted $C_1$–$C_4$ alkyl, optionally substituted $C_1$–$C_4$ alkylcarbonyl, optionally substituted phenyl or optionally substituted phenylcarbonyl, $R^2$ represents —W—$NHR^3$ or

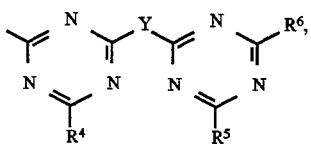

wherein
W and Y represent bridge members,
$R^4$, $R^5$, $R^6$ independently of one another represent halogen, hydroxyl, $C_1$–$C_6$-alkoxy, $C_1$–$C_6$-alkyl or optionally substituted amine and $R^3$ represents and n represents, in each case independently of one another, 0 or 1.

Suitable substituents which may be mentioned for optionally substituted $C_1$–$C_4$-alkyl and $C_1$–$C_4$-alkylcarbonyl in the definition of $R^1$ are OH or amino, and suitable substituents which may be mentioned for optionally substituted phenyl and phenylcarbonyl are $SO_3H$ and COOH.

Examples of W which may be mentioned are

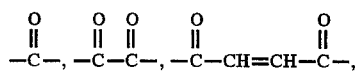

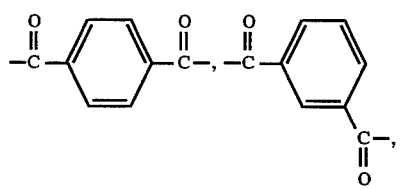

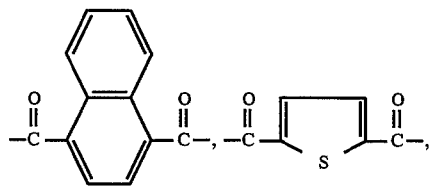

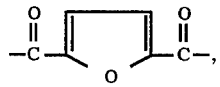

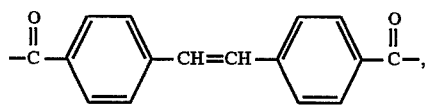

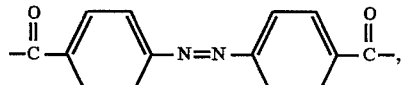

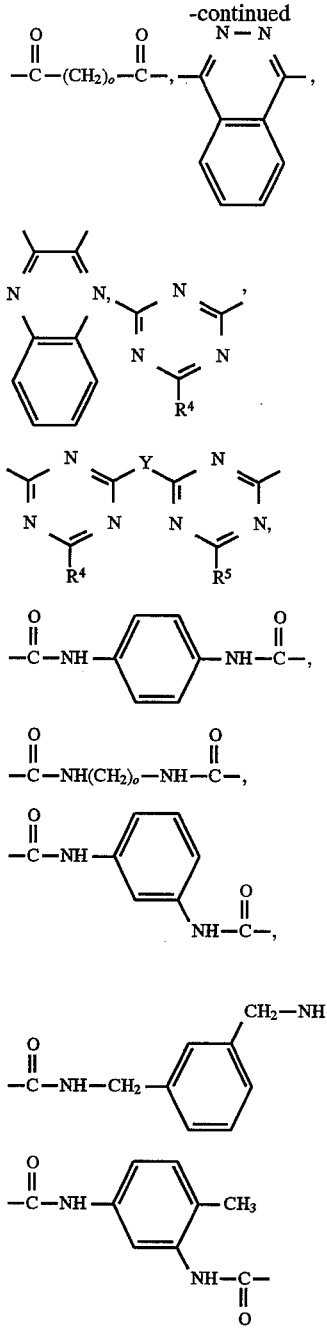
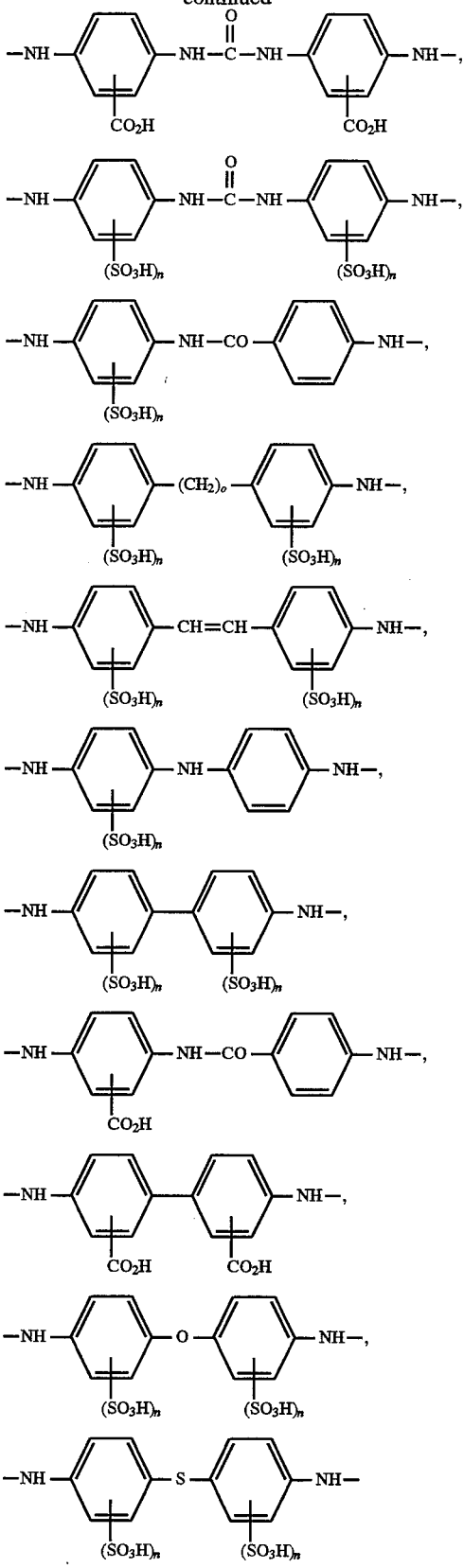
wherein
o represents 1 to 6.
Examples of Y which may be mentioned are
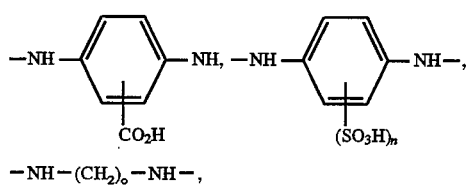
wherein
o represents 1 to 6 and n represents, in each case independently of one another, 0 or 1.

Preferably, $R^4$, $R^5$ and $R^6$ independently of one another represent halogen, in particular fluorine, chlorine or bromine, or an optionally substituted amino group of the formula

—$NR^7R^8$, wherein

- $R^7$ and $R^8$ independently of one another represent hydrogen or an aliphatic, aromatic, araliphatic or cycloaliphatic radical,
- $R^8$ furthermore also represents hydroxyl, $C_1$–$C_4$-alkoxy, amino, phenylamino or $C_1$–$C_4$-alkoxyamino, or
- $R^7$ and $R^8$ together with the nitrogen atom to which they are bonded, form a 3- to 8-membered, preferably 5- to 7-membered, saturated or unsaturated ring which optionally contains 1 or 2 further heteroatoms from the series consisting of oxygen, sulphur and nitrogen and is optionally substituted by $C_1$–$C_4$-alkyl, $C_1$–$C_4$-hydroxyalkyl or $C_1$–$C_4$-aminoalkyl.

Examples of aliphatic radicals in the definition of $R^7$ and $R^8$ are alkyl radicals, in particular $C_1$–$C_6$-alkyl, which is optionally substituted by $C_1$–$C_4$-alkoxy, $C_5$–$C_6$-cycloalkyl, hydroxyl, carboxyl, sulphato, sulpho or amino, and which is optionally interrupted by one or more imino groups.

Examples of aromatic and araliphatic radicals in the definition of $R^7$ and $R^8$ are phenyl and naphthyl radicals and phenyl-$C_1$–$C_4$-alkyl and naphthyl-$C_1$–$C_4$-alkyl, wherein the phenyl and naphthyl radicals in each case are optionally mono- or poly-substituted in an identical or different manner by hydroxyl, carboxyl, sulpho, $C_1$–$C_4$-alkyl or $C_1$–$C_4$-alkoxy. Examples of cycloaliphatic radicals in the definition of $R^7$ and $R^8$ are cyclopentyl and cyclohexyl.

Preferred amino groups are those of the formula

—$NR^7R^8$ wherein

- $R^7$ and $R^8$ independently of one another represent hydrogen, or represent $C_1$–$C_6$-alkyl which is optionally substituted by carboxyl, hydroxyl, $C_1$–$C_4$-alkoxy, amino or sulpho, or represent phenyl-$C_1$–$C_4$-alkyl,
- $R^8$ furthermore represents a polyalkylene-polyamine radical, preferably pentaethylenehexamine, tetraethylenepentamine, triethylenetetramine or diethylenetriamine, or
- $R^7$ and $R^8$ together with the nitrogen atom to which they are bonded, form a saturated 5- or 6-membered ring, which can contain a further oxygen or nitrogen atom and which is optionally substituted by $C_1$–$C_4$-alkyl, $C_1$–$C_4$-hydroxyalkyl or $C_1$–$C_4$-aminoalkyl.

Preferred dyestuffs are those wherein $R^1$ denotes H, $CH_3$, $C_2H_4OH$, $C_2H_4NH_2$, phenyl, 3- or 4-sulphophenyl, 3- or 4-carboxyphenyl, acetyl, propionyl, benzoyl or maleinyl.

Examples of amine radicals —$NR^7R^8$ are $NH_2$, $NHCH_3$, $N(CH_3)_2$, $N(C_2H_5)_2$, $NHC_2H_5$, $NHCH_2CH_2OH$, $NHCH_2CH_2OCH_3$, $N(C_2H_4OH)_2$,

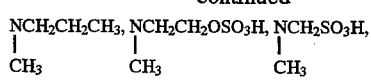

-continued

$HNCH_2CH_2OSO_3H$, $NHCH_2CH_2SO_3H$, $NHCH(CH_3)_2$,

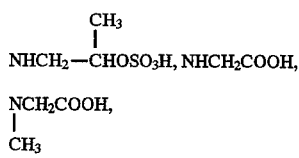

$NHCH_2CH_2COOH$, $N(C_2H_4OSO_3H)_2$, $NH(CH_2)_{10}COOH$, $NH(CH_2CH_2NH)_p$—$CH_2CH_2NH_2$, p=0–4, $NHCH_2CH_2CH_2N(CH_3)CH_2CH_2OH$,

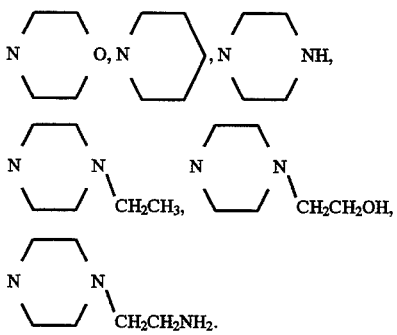

Preferred dyestuffs of the formula (I) are those wherein

R represents $NHR^2$, $NHR^3$, —CH=CH—$R^3$, —$CH_2$—$CH_2$—$R^3$ or

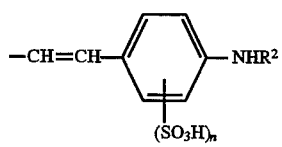

$R^1$ represents H, $CH_3$, $C_2H_4OH$, $C_2H_4NH_2$, phenyl, 3- or 4-sulphophenyl, 3- or 4- carboxyphenyl, acetyl, propionyl, benzoyl or maleinyl, W represents a radical of the formula

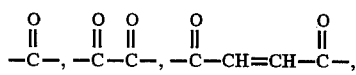

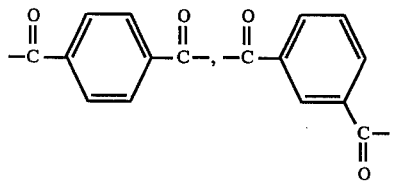

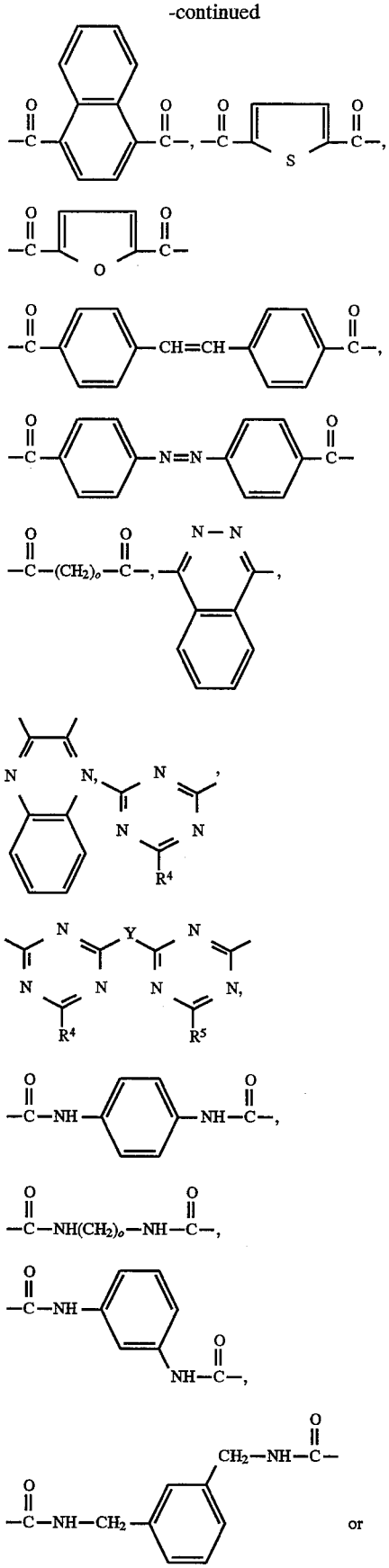
or
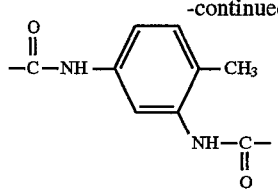
wherein
o represents 1 to 6,
Y represents a radical of the formula
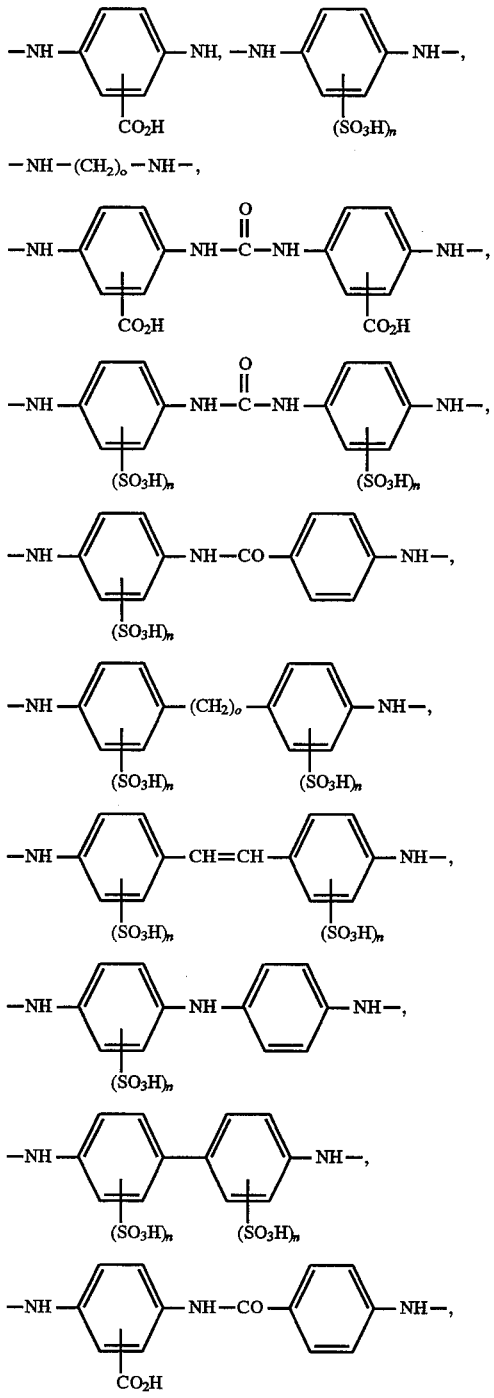

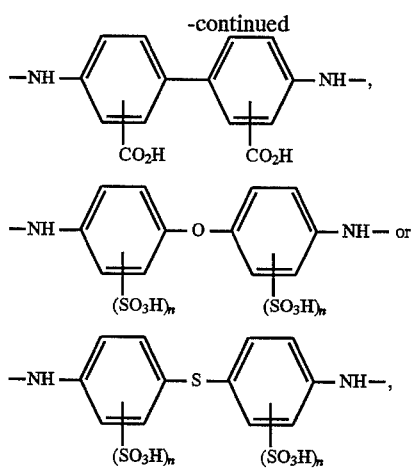

wherein
o represents 1 to 6 and
n represents, in each case independently of one another, 0 or 1, and the sum of all the n's is $\geq 2$, and $R^4$, $R^5$ and $R^6$ independently of one another represent fluorine, chlorine, bromine or an optionally substituted amino group of the formula $NR^7R^8$ wherein
$R^7$ and $R^8$ independently of one another represent hydrogen or an aliphatic, aromatic, araliphatic or cycloaliphatic radical.

Particularly preferred dyestuffs of the formula (I) are those wherein

W represents

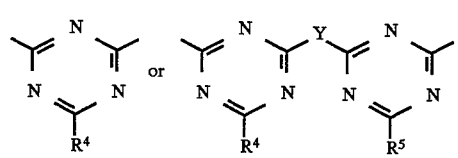

and

Y represents

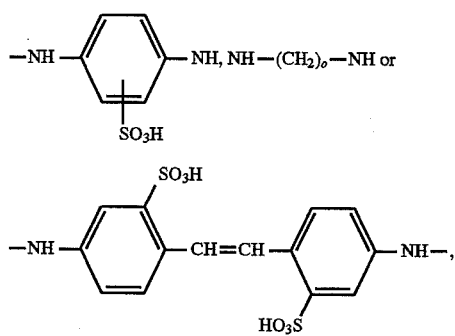

wherein
o represents 1 to 6, and
$R^4$ and $R^5$ have the abovementioned meaning.

The preparation of the dyestuffs (1) where $R=NHR^2$ and

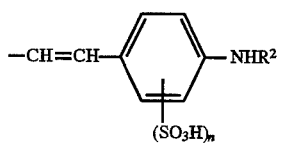

is carried out in a manner which is known per se by reaction of the colour base of the formula (IIa) or (IIb)

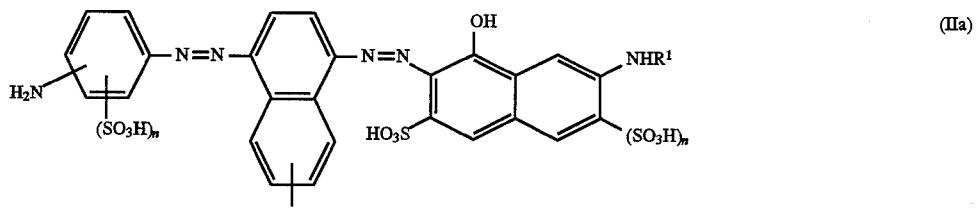
(IIa)

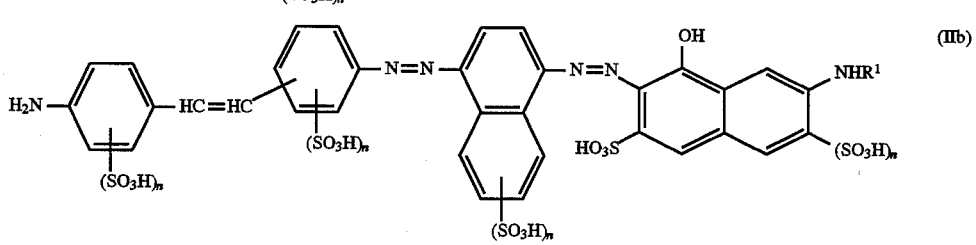
(IIb)

wherein n and $R^1$ have the abovementioned meaning, with a compound of the formula $Hal-W-NHR^3$ or (III)

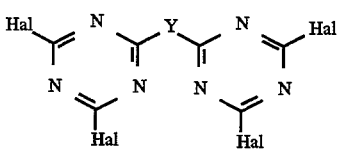
(IV)

wherein Hal represents chlorine, bromine or fluorine and $R^3$, W and Y have the abovementioned meaning.

The condensation reaction of the colour base (IIa) or (IIb) with (III) or (IV) is preferably carried out in an aqueous or aqueous-organic medium at temperatures of 20°–60° C., the hydrogen halide acid liberated during the condensation reaction being trapped, if appropriate, by addition of acid-binding agents.

In the case of the reaction with fragments containing halogenotriazine, halogen can be replaced by amine radicals of the formula $HR^4$, $HR^5$ or $HR^6$ in another condensation reaction. This condensation reaction is likewise carried out in an aqueous or aqueous-organic medium at temperatures of 60°–100° C., the hydrogen halide liberated during the condensation reaction being neutralized by addition of acid-binding agents. Acid-binding agents are, in addition to alkali metal or alkaline earth metal hydrogen carbonates, carbonates, hydroxides, phosphates or borates, also amines of the formula $HNR^7R^8$, which are employed in excess. In addition, tertiary amines, such as triethylamine, or pyridine bases, such as pyridine, picoline or quinoline, can also be used.

The preparation of the dyestuffs (I) where R=$OR^3$, $SR^3$, $NHR^3$, —CH=CH—$R^3$ and —$CH_2$—$CH_2$—$R^3$ is carried out by tetrazotization of the amines (V)

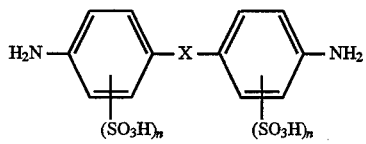 (V)

wherein n represents, in each case independently of one another, 0 or 1 and

X represents O, S, NH, —CH=CH— or —$CH_2$—$CH_2$—, and coupling of the tetrazotization product to compounds (VI)

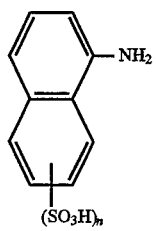 (VI)

wherein n denotes 0 or 1, and subsequent further tetrazotization and coupling to (VII)

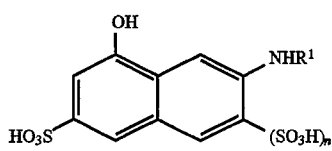 (VII)

wherein n and $R^1$ have the abovementioned meaning.

The dyestuffs of the formula (I) dye cellulose-containing materials, in particular paper, cotton and viscose, as well as leather, with good wet- and light-fastnesses.

The dyestuffs can be used by all the processes customary for direct dyestuffs in the paper and textile industry, in particular in the pulp and surface dyeing of paper for sized or non-sized grades, starting from bleached or unbleached cellulose of varying origins, such as softwood or hardwood sulphite and/or sulphate cellulose. They can also be used in the yarn and piece dyeing of cotton, viscose and linen by the exhaust process from a long liquor or in continuous processes.

The invention furthermore relates to a process for dyeing cellulose-containing materials using the dyestuffs of the formula (I).

The compounds of the formula (I) can also be employed in the form of dyestuff preparations. This use form is preferred in particular for dyeing paper. Processing into stable liquid, aqueous, concentrated dyeing preparations can be carried out in the generally known manner, by dissolving in water, if appropriate with addition of one or more auxiliaries, for example a hydrotropic compound or a stabilizer. The possibility of preparing such stable aqueous-concentrated preparations in the course of the dyestuff synthesis itself without intermediate isolation of the dyestuff is of particular advantage.

The present invention furthermore relates to liquid dyestuff preparations comprising at least one dyestuff (1), a solvent and, if appropriate, auxiliaries.

Suitable hydrotropic auxiliaries are, for example, low molecular weight amides, lactones, alcohols, glycols or polyols, low molecular weight ethers or oxyalkylation products as well as nitriles or esters; preferred possible auxiliaries here are methanol, ethanol and propanol; ethylene glycol, propylene glycol, diethylene glycol, thiodiethylene glycol and dipropylene glycol; butanediol; γ-hydroxypropionitrile, pentamethylene glycol, ethylene glycol monoethyl and -propyl ether, ethylene diglycol monoethyl ether, triethylene glycol monobutyl ether, butylpolyglycol, formamide, dimethylformamide, pyrrolidone, N-methylpyrrolidone, glycol acetate, butyrolactone, urea and ε-caprolactam.

The dyestuffs of the formula (I) according to the invention furthermore are suitable for the preparation of printing inks, which can also be employed, in particular, as recording liquids in the ink jet process.

The invention furthermore relates to printing inks comprising at least one dyestuff (I) and their use as a recording liquid for ink jet recording systems.

The printing inks in general comprise about 1–20% by weight of one or more dyestuffs (I), 80–90% by weight of water and/or polar protic or dipolar aprotic solvents, and, if appropriate, other customary constituents.

Preferred solvents here are polyhydric alcohols and ethers or esters thereof, carboxylic acid amides, sulphoxides and sulphones, in particular those having molecular weights of<200. Particularly suitable solvents are, for example, ethylene glycol, diethylene glycol, triethylene glycol, 1,5-pentanediol, 2-hydroxyethyl acetate, 2-(2'-hydroxy)-ethyl acetate, glycerol, 1,2-dihydroxypropane, 1-methoxy-2-propanol, 2-methoxy-1-propanol, N,N-dimethylformamide, pyrrolidone, ε-caprolactam, N-methyl-ε-caprolactam, tetramethylurea, 1,3-dimethyl-2-imidazolidinone, N,N'-dimethylpropyleneurea, dimethyl sulphoxide, dimethyl sulphone and sulpholane.

The printing inks can be prepared by dissolving the salts of the dyestuff (I) in water and/or one or more of the abovementioned organic solvents, if appropriate at elevated temperatures and with the addition of inorganic and organic bases, or directly from the condensation solutions, which, if appropriate, are subjected to desalination, for example by pressure permeation. If appropriate, customary ionic or nonionic additives can additionally also be used, for example those with which the viscosity can be lowered and/or the surface tension can be increased.

Instead of salts of (I) it is also possible to employ the corresponding free acids in combination with at least equimolar amounts of the corresponding bases.

Inorganic bases which can be employed are, for example, lithium hydroxide, sodium hydroxide, potassium hydroxide, lithium carbonate, sodium carbonate and potassium carbonate.

Organic bases which can be used are, for example, ethanolamine, diethanolamine, triethanolamine, N-methylethanolamine, N,N-dimethylethanolamine, N-methyldiethanolamine, 1-amino-2-propanol, 2-amino-1-propanol, di-isopropanolamine, N-2-hydroxyethyldiisopropanolamine, tris-N,N,N-[2-(2'-hydroxyethoxy)-ethyl]-amine or sodium methylate, lithium ethylate or potassium tert-butylate.

The following advantages result from the use of the printing inks according to the invention as recording liquids for ink jet recording systems: the physical properties, such as viscosity, surface tension and the like, are in the suitable ranges and the recording liquid causes no blockages in fine delivery openings of ink jet recording devices; it produces images of high density; on storage, no change in the physical properties and no deposition of solid constituents occurs in the recording liquid; the recording liquid is suitable for recording on various recording media without limitations in respect of the type of recording media; finally, the recording liquid is fixed rapidly and produces images of excellent waterproofness, light-fastness, abrasion resistance and resolution.

The following preparation examples are intended to illustrate the present invention, but without limiting it thereto. In the examples, parts always denote parts by weight, unless stated otherwise.

All the $\lambda_{max}$ values are measured in water at pH 10.

EXAMPLE 1

Preparation of Dyestuff Precursor (A)

46.0 parts of 2-amino-5-acetylaminobenzenesulphonic acid are dissolved in 500 parts of water at a pH of 5.0 and at 50° C. and, after the solution has cooled to room temperature, 58 parts of 30% strength hydrochloric acid are added, while stirring. 13.8 parts of sodium nitrite are then added dropwise in the form of a 30% strength aqueous solution at 0°–5° C. After 0.5 hour at 5°–10° C., excess nitrite is destroyed by addition of a little amidosulphonic acid.

44.6 parts of 8-amino-naphthalene-2-sulphonic acid are dissolved in 600 parts of water at pH 7.5 and 50° C. and the solution is then cooled to room temperature. This solution is slowly added at pH 3.0 to the diazonium salt suspension obtained in accordance with paragraph 1, while stirring. The pH is then increased to 5.5. After the mixture has been stirred for 1 hour, the pH is brought to 7.0 with 45% strength sodium hydroxide solution, and 500 parts of sodium chloride are added. After the mixture has been stirred for 1 hour, the solid is filtered off with suction and washed several times with saturated sodium chloride solution and the suction filter cake is dried in vacuo at 60° C. After drying, 175 parts of salt-containing precursor are obtained.

87.5 parts of this precursor are dissolved in 800 parts of water at pH 7.0 and 50° C., and 6.9 parts of sodium nitrite in the form of a 30% strength solution are added at room temperature. This solution is then added to a mixture of 100 parts of water, 100 parts of ice, 58 parts of 30% strength hydrochloric acid and 0.1 part of sodium nitrite in the course of 0.5 hour, while stirring. After the mixture has been stirred at 10°–15° C. for 1 hour, excess nitrite is destroyed by addition of a little amidosulphonic acid.

31.9 parts of RR acid (1-naphthol-7-amino-3,6-disulphonic acid) are dissolved in 300 parts of 20% strength sodium carbonate solution, the diazonium salt suspension obtained according to the previous paragraph is then added in the course of 0.25 hour, while stirring, and the mixture is stirred at pH 9.3 for a further 1.5 hours. The solid is filtered off with suction and washed with 5% strength sodium chloride solution until the runnings are clear.

The suction filter cake is stirred into 800 parts of water, 180 parts of 45% strength sodium hydroxide solution are added for hydrolysis of the acetylamino group and the mixture is stirred at 50° C. for 1.5 hours. It is cooled to 20° C. and brought to a pH of 6.0 at 20°–30° C. by addition of 30% strength hydrochloric acid. After the mixture has been stirred for 1 hour, the black precipitate is filtered off with suction, washed with 10% strength sodium chloride solution and dried at 80° C. in vacuo. 60.2 parts of the sodium salt of dyestuff precursor (A) which, in the form of its free acid, corresponds to the following formula (NaCl content 10.3%)

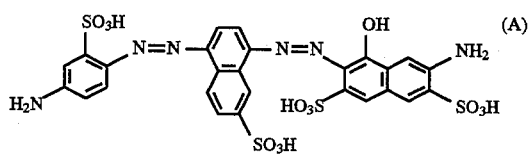

$\lambda_{max}$: 595, 452 nm are obtained.

EXAMPLE 2

Preparation of Dyestuff Precursor (B)

115 parts of 2-amino-4-acetylaminobenzenesulphonic acid are stirred into 1200 parts of water, and 200 parts of ice and 112 parts of 30% strength hydrochloric acid are added. 34.5 parts of sodium nitrite in the form of a 30% strength aqueous solution are then added dropwise at 0°–5° C. After 0.5 hour at 5°–10° C., any excess nitrite is destroyed by addition of a little amidosulphonic acid.

113.5 parts of 8-amino-naphthalene-2-sulphonic acid are dissolved in 1200 parts of water at pH 7.5 and 50° C., and 400 parts of ice are then added. This solution is slowly added to the diazonium salt suspension obtained in accordance with paragraph 1, while stirring. The pH is then increased to 4.0 by addition of 50 parts of sodium acetate. After the mixture has been stirred for 1 hour, the pH is brought to 6.0 with 45% strength sodium hydroxide solution, and 300 parts of sodium chloride are added. After the mixture has been stirred for 1 hour, the solid is filtered off with suction. The suction filter cake is stirred with 3000 parts of water at 30°–40° C. and brought to a pH of 8.5 by addition of a little 45% strength sodium hydroxide solution. 600 parts of ice And then 225 parts of 30% strength hydrochloric acid are then added. 34.5 parts of sodium nitrite are added dropwise in the form of a 30% strength solution in the course of 0.5 hour. After the mixture has been stirred at room temperature for 0.5 hour, excess nitrite is destroyed by addition of a little amidosulphonic acid.

159.6 parts of RR acid (1-naphthol-7-amino-3,6-disulphonic acid) are dissolved in 1200 parts of 20% strength sodium carbonate solution, the diazonium salt solution obtained in accordance with the previous paragraph is then added at room temperature in the course of 0.25 hour, while stirring, and the mixture is stirred at pH 9.3 for a further hour. The pH is brought to 7.5 by addition of 30% strength hydrochloric acid and the solid is filtered off with suction and washed with 1000 parts of 10% strength sodium chloride solution.

The suction filter cake is stirred into 3000 parts of hot water at 70° C., 1100 parts of 45% strength sodium hydroxide solution are added for hydrolysis of the acetylamino group, and the mixture is stirred at 50°–60° C. for 1.5 hours. It is cooled to 20° C. and brought to a pH of 6.5 by addition of 30% strength hydrochloric acid. After the mixture has been stirred for 1 hour, the black precipitate is filtered off with suction, washed with 10% strength sodium chloride solution and dried at 80° C. in vacuo. 254 parts of the sodium salt of dyestuff precursor (B) which, in the form of its free acid, corresponds to the following formula (NaCl content: 10.3%)

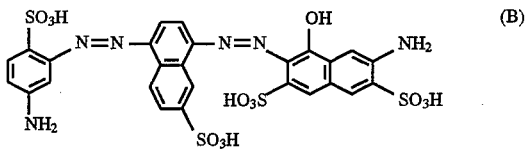
(B)

$\lambda_{max}$: 583, 439 nm are obtained.

EXAMPLE 3

9.4 parts of dyestuff precursor (B) obtained according to Example 2 are stirred into 200 parts of water, and 1 part of terephthalic acid dichloride is added at room temperature and pH 8.0–8.5. The temperature is increased to 40° C. and the pH is brought to 8.0–9.0 by addition of 2N sodium hydroxide solution. After 5 hours at this temperature and pH 8.0–9.0, the temperature is increased to 60° C. After a further hour, the mixture is cooled to room temperature and brought to a pH of 3.0 by addition of 2N hydrochloric acid. The black dyestuff which has precipitated is filtered off with suction, washed with 2.5% strength sodium chloride solution dried at 80° C. in vacuo. 9.6 parts of the sodium salt of a dyestuff according to the invention which, in the form of its free acid, corresponds to the following formula (NaCl content 8.5%)

5 parts of this dyestuff are stirred into 80 parts of water and the pH is brought to 10.0 by addition of 2N sodium hydroxide solution. A total weight of 100 parts is established by addition of water. If the stable liquid finished formulation thus obtained is used for the preparation of a 1.5% strength ink jet recording liquid by the process of Example 6, an ink is obtained with which deep black prints in light- and wet-fast colour shades can be produced on customary writing paper.

EXAMPLE 4

1 part of cyanuric chloride is dispersed in 100 parts of water and 50 parts of ice, with addition of 0.1 part of a commercially available emulsifier, and 4.7 parts of dyestuff precursor (B) obtained according to Example 2 are then added. The temperature is allowed to rise to 15° C., while stirring, during which the pH is kept at 3.5–4.0 with 2N sodium hydroxide solution. After addition of a further 4.7 parts of dyestuff precursor (B), the temperature is increased to 40° C. and the pH to 7.5. After 1.5 hours, the temperature is increased to 60° C. After the mixture has been stirred at this temperature and at pH 7.0–7.5 for 3 hours, 2.3 parts of pentaethylenehexamine are added. The pH rises to 10.0. After the mixture has been stirred at this temperature for 1 hour, it is allowed to cool to room temperature, the pH is brought to 6.0 with 2N hydrochloric acid and the solid is filtered off with suction, washed with water and dried in vacuo at 80° C. 9.8 parts of a dyestuff according to the invention which, in the form of its free acid, corresponds to the following formula

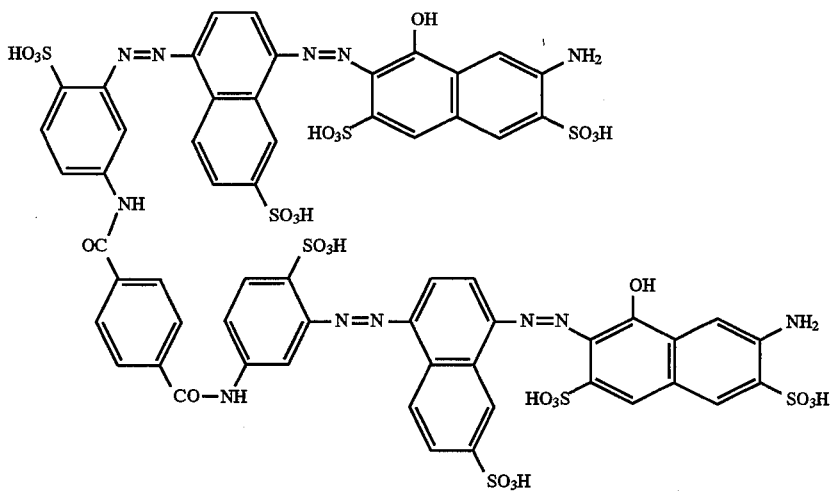

$\lambda_{max}$: 592, 444 nm are obtained.

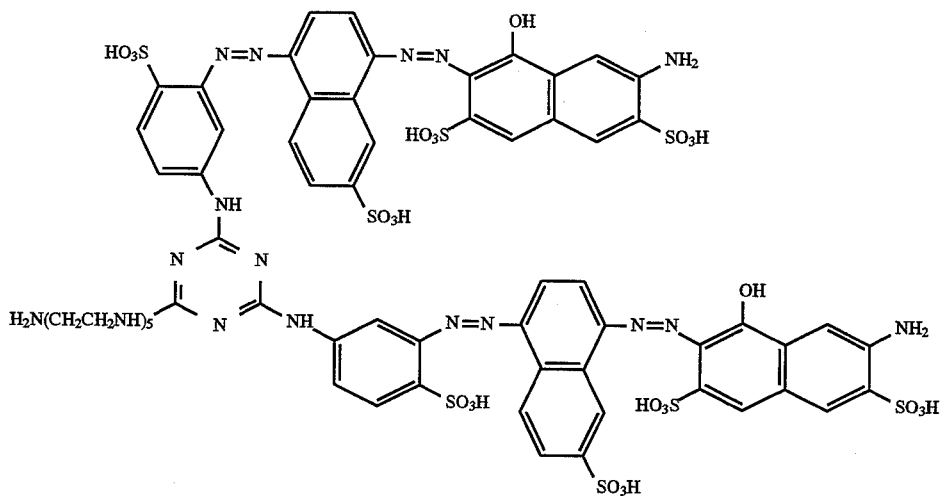

$\lambda_{max}$: 606, 456 nm are obtained.

5 parts of this dyestuff are stirred into 80 parts of water and the pH is brought to 9.5 by addition of 2N sodium hydroxide solution. A total weight of 100 parts is established by addition of water, so that an approximately 5% strength liquid finished formulation according to the invention of the above dyestuff is obtained.

EXAMPLE 5

A mixture of 50% of bleached pine sulphate cellulose and 50% of bleached beech sulphate cellulose is beaten to a freeness of 36° SR at a pulp density of 2.5%.

To 200 parts of this suspension, comprising 5 parts of cellulose, are added, in a glass beaker, 20 ml of a 3% strength aqueous solution of the liquid finished formulation according to the invention from Example 4 (3%, based on the cellulose), and the mixture is stirred for 5 minutes. 10 parts of a 1% strength rosin size solution are then added, 15 parts of a 1% strength aluminium sulphate solution are added after a further minute, the mixture is diluted with 800 parts of water and stirring is continued for 3 minutes.

A sheet of paper is formed from this cellulose suspension on a manual sheet-forming machine and the sheet obtained is pressed off on a manual press and dried on a drying cylinder at 100° C. for 10 minutes, turning twice.

The paper dyeing thus obtained shows a neutral black with a good depth of colour and has a good fastness to bleeding and light.

EXAMPLE 6

30 parts of the liquid finished formulation obtained according to Example 4 (dyestuff content about 5%) are diluted with a mixture of 61 parts of water and 9 parts of diethylene glycol. The recording liquid thus obtained with a dyestuff content of about 1.5% produces prints in light- and wet-fast black shades on customary writing paper by means of a Hewlett-Packard DeskJet printer (DeskJet is a registered trademark of the Hewlett-Packard Company, USA).

EXAMPLE 7

If the in each case 4.7 parts of dyestuff precursor (B) in Example 4 are replaced by in each case 4.7 parts of dyestuff precursor (A) according to Example 1 and the procedure is otherwise analogous, a black dyestuff according to the invention which, in the form of its free acid, corresponds to the following formula

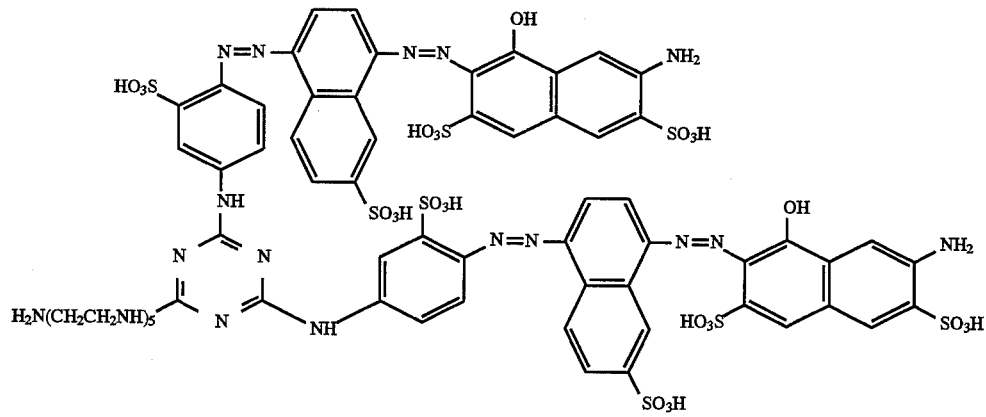

$\lambda_{max}$: 595, 451 nm is obtained.

The dyestuff can be used in the form of a 5% strength liquid finished formulation analogously to Example 4 for the preparation of recording liquids according to Example 6, these liquids likewise allowing fast black prints.

EXAMPLE 8

Preparation of Dyestuff Precursor (C)

82.06 parts of 4'-acetylamino-4-aminostilbene-2,2'-disulphonic acid (obtained by acetylation and subsequent hydrogenation of 4'-nitro-aminostilbene-2,2'-disulphonic acid) are stirred into a mixture of 400 parts of ice and 800 parts of water, 100 parts of a 30% strength hydrochloric acid are added, and 13.8 parts of sodium nitrite in the form of a 30% strength aqueous solution are added dropwise. After the mixture has been stirred at 0° to 5° C. for 1 hour, excess nitrite is destroyed by addition of a little amidosulphonic acid.

44.6 parts of 8-amino-naphthalene-2-sulphonic acid are dissolved in 600 parts of water at pH 7.5 and 50° C., and 200 parts of ice are then added. After a pH of 5.0 has been established, this mixture is slowly added to the diazonium salt suspension obtained in accordance with paragraph 1, while stirring. The pH is then increased to 4.0 by addition of 100 g of sodium acetate. After the mixture has been stirred at this temperature for 2 hours, the solid is filtered off with suction, washed twice with water and dried at 60° C. in vacuo. 144 parts of precursor are obtained.

108.9 parts of this precursor are dissolved in 1000 parts of water at pH 8.0, and 10.2 parts of sodium nitrite are added in the form of a 30% strength aqueous solution. This mixture is allowed to run into a mixture of 250 parts of ice, 250 parts of water, 0.1 part of sodium nitrite and 115 parts of 30% strength hydrochloric acid in the course of 15 minutes, while stirring. After the mixture has been stirred at 15° to 20° C. for 1 hour, excess nitrite is destroyed by addition of a little amidosulphonic acid.

The suspension obtained in the preceding paragraph is slowly added to a solution of 60.6 parts of RR acid (1-naphthol-7-amino-3,6-disulphonic acid) in 600 parts of 20% strength sodium carbonate solution. The pH is kept at 8.5 by addition of 15% strength sodium hydroxide solution. After the mixture has been stirred at room temperature for 1 hour, the product is salted out by addition of 200 parts of sodium chloride. After 0.5 hour, the solid is filtered off with suction and washed several times with 10% strength sodium chloride solution. The moist suction filter cake is stirred into 1000 parts of hot water at 80° C. and, after addition of 370 parts of 40% strength sodium hydroxide solution, the mixture is stirred at 80° to 85° C. for 2 hours. The pH is then brought to 2.0, after cooling to room temperature, by addition of 350 parts of 30% strength hydrochloric acid. The solid is then filtered off with suction and washed with 5% strength sodium chloride solution, and the suction filter cake is dried at 80° C. in vacuo. 102.3 parts of the sodium salt of dyestuff precursor (C) (NaCl content 15%) which, in the form of its free acid, corresponds to the following formula:

EXAMPLE 9

6.1 parts of dyestuff precursor (C) obtained according to Example 8 (=5.2 parts of salt-free product) are dissolved in 150 parts of water at a pH of 5.0, and 1 part of finely comminuted cyanuric chloride is added. After the mixture has been stirred at room temperature for 0.5 hour, a further 6.1 parts of precursor (C) are added and the pH is increased to 6.5–7.5 with 1N sodium hydroxide solution. The mixture is heated to 40°–45° C., kept at this temperature for 1 hour and then stirred at 60° C. for a further 0.5 hour. 3.5 parts of pentaethylenetetramine are added and the temperature is increased to 80° C. After a further 0.5 hour, the mixture is cooled to room temperature and the pH is brought to 7.0 by addition of 30% strength hydrochloric acid. After the mixture has been stirred for 1 hour, the solid is filtered off with suction, washed with water and dried at 80° C. in vacuo. 10.1 parts of a dyestuff according to the invention which, in the form of its free acid, corresponds to the following formula

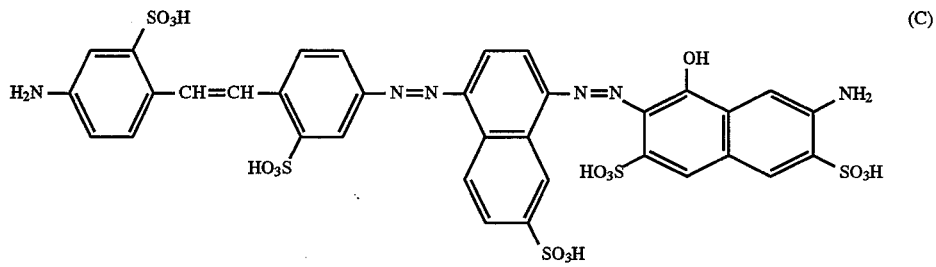

(C)

$\lambda_{max}$: 595, 466 nm are obtained.

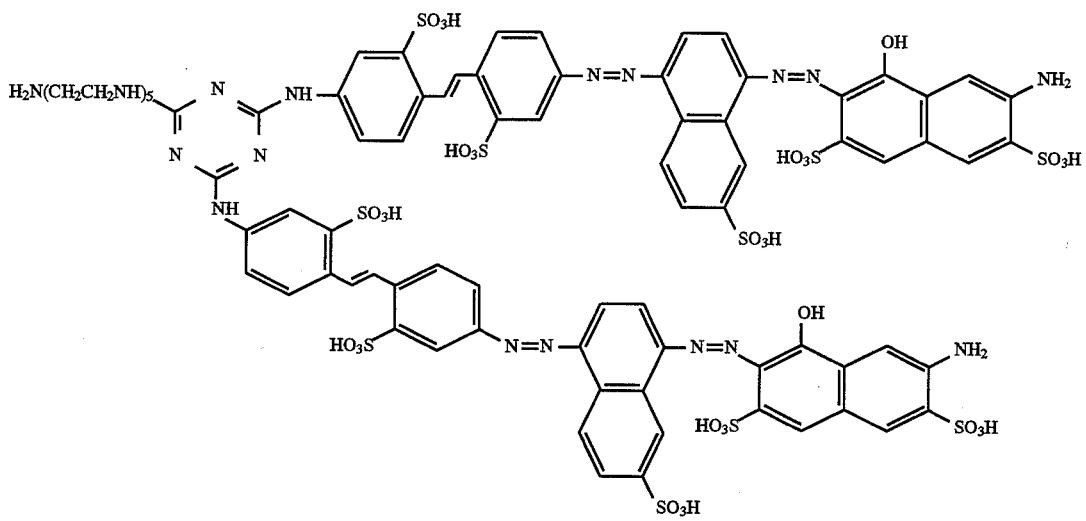

$\lambda_{max}$: 602, 471 nm are obtained.

5 parts of this dyestuff are stirred into 80 parts of water and the pH is brought to 10.0 by addition of 2N sodium hydroxide solution. A total weight of 100 parts is established by addition of water, so that an approximately 5% strength liquid finished formulation according to the invention of the above dyestuff is obtained. This can be used analogously to Example 4 for the preparation of recording liquids according to Example 6, these liquids likewise allowing very fast black prints.

If the 3.5 parts of pentaethylenehexamine in the above example are replaced by 1.5 parts of triethylenetetramine, a dyestuff having comparable properties is obtained.

C. After a further 0.5 hour at 60° C., the mixture is cooled to room temperature and the pH is brought to 7.0 by addition of 30% strength hydrochloric acid. After the mixture has been stirred for 1 hour, the solid is filtered off with suction, washed with water and dried at 80° C. in vacuo. 12.1 parts of a dyestuff according to the invention which, in the form of its free acid, corresponds to the following formula

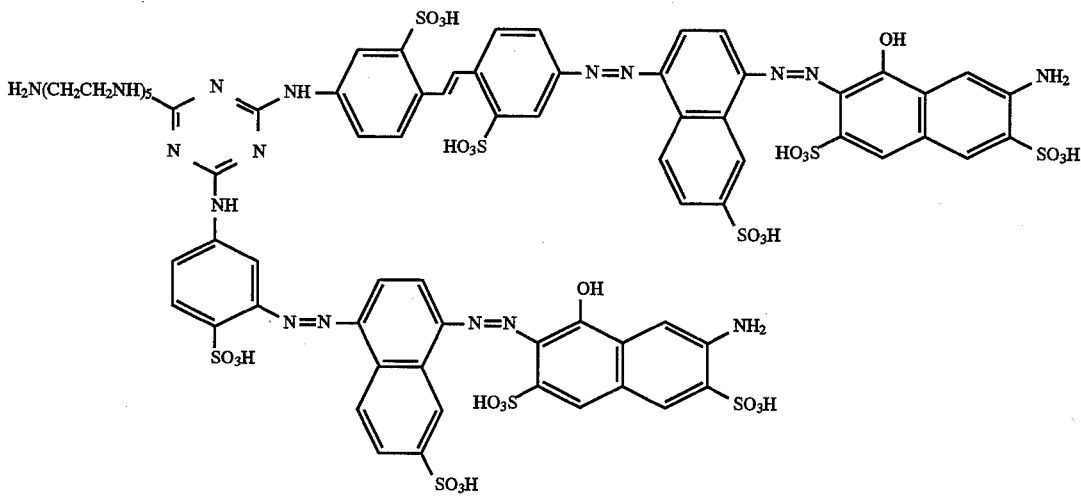

$\lambda_{max}$: 605, 466 nm are obtained.

5 parts of this dyestuff are stirred into 80 parts of water and the pH is brought to 9.5 by addition of 2N sodium hydroxide solution. A total weight of 100 parts is established by addition of water, so that an approximately 5% strength liquid finished formulation according to the invention of the above dyestuff is obtained. This can be used analogously to Example 4 for the preparation of recording liquids according to Example 6, these liquids likewise allowing very fast black prints.

EXAMPLE 10

1 part of finely comminuted cyanuric chloride is stirred into 150 parts of water at 0°–5° C. 4.7 parts of dyestuff precursor (B) obtained according to Example 2 (=4.2 parts of salt-free product) are then added. After the mixture has been stirred at –5° C. and pH 3.5–4.0 for 0.5 hour, 6.1 parts of precursor (C) according to Example 8 are added and the pH is increased to 7.0–7.5 with 1N sodium hydroxide solution. The mixture is heated to 40° C. and kept at this temperature for a further hour. 2.3 parts of pentaethylenetetramine are added and the temperature is increased to 60°

A similar dyestuff is obtained if the 2.3 parts of pentaethylenehexamine used in the above example are replaced by 1.2 parts of N-(2-hydroxyethyl)-1,3-propanediamine.

If the 6.1 parts of dyestuff precursor (B) in the above example, paragraph 1, are replaced by 6.1 parts of dyestuff precursor (A) according to Example 1 and the procedure is otherwise as described in paragraph 1, a dyestuff having comparable properties is obtained.

EXAMPLE 11

If the amount of 2.3 parts of pentaethylenehexamine to be used in the last paragraph of Example 10 are replaced by 1.2 parts of N-(2-hydroxyethyl)-1,3-propanediamine the procedure is otherwise analogous, a dyestuff which, in the form of its free acid, corresponds to the following formula and the procedure is otherwise analogous, a dyestuff which, in the form of its free acid, corresponds to the following formula

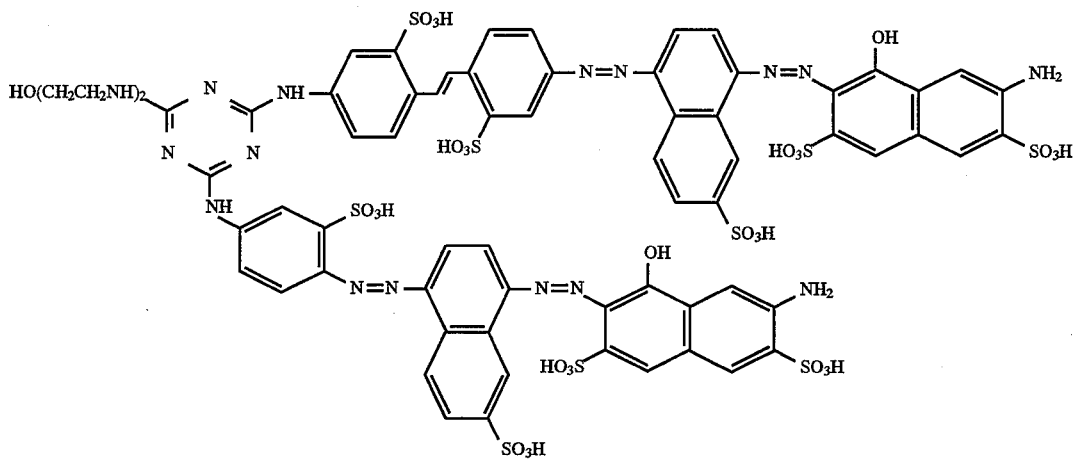

$\lambda_{max}$: 607, 468 nm is obtained.

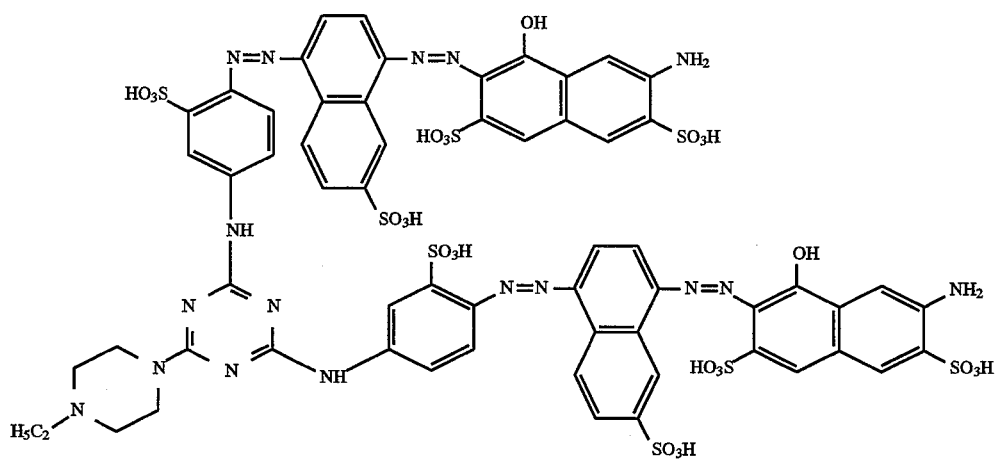

This dyestuff can also be converted at pH 9.5 without problems, in accordance with the above statements, into a stable 5% strength liquid finished formulation which, when introduced into recording liquids, allows deep black INKJET prints having good wet-fastnesses.

EXAMPLE 12

If the 2.5 parts of pentaethylenehexamine employed in Example 7 are replaced by 1.2 parts of N-ethylpiperazine $\lambda_{max}$: 609, 460 nm is obtained.

This dyestuff also produces wet-fast, deep black colour shades in INKJET printing when introduced into recording liquids.

EXAMPLE 13

4.0 parts of finely comminuted cyanuric chloride and 1 drop of commercially available emulsifier are dispersed in 300 parts of water and 200 parts of ice at 0°–5° C. 8.2 parts of 4,4'-diaminostilbene-2,2'-disulphonic acid in the form of an 18% strength solution of the disodium salt are then added dropwise in the course of 1.5 hours and the pH is initially kept at 2.0–2.5 by addition of 2N hydrochloric acid. In the subsequent course of the reaction, the pH is kept constant by dropwise addition of 2N sodium hydroxide solution. The mixture is stirred at 15° C. for a further 0.25 hour and 18.5 parts of precursor (A), obtained according to Example 1 are then added. The pH is kept at 6.5 to 7.2 and the temperature is increased for in each case 1 hour to 20°–30° C. and 40° C. After 4.5 hours at 60° C., 7.7 parts of pentaethylenehexamine are added, the temperature is increased to 80° C. and the mixture is stirred at this temperature and pH 9.5 for 1.5 hours. It is cooled to room temperature and the pH is brought to 6.0 by addition of 30% strength hydrochloric acid. The dyestuff which has precipitated is filtered off with suction, washed with water and dried at 80° C. in vacuo. 27 parts of a dyestuff according to the invention which, in the form of its free acid, corresponds to the following formula hydroxide solution. A total weight of 100 parts is established by addition of water, so that an approximately 5% strength liquid finished formulation according to the invention of the above dyestuff is obtained. This can be used analogously to Example 4 for the preparation of recording liquids according to Example 6 which allow prints in deep, wet-fast shades in the INKJET.

EXAMPLE 14

4.4 parts of the dyestuff obtained according to Example 9 are dispersed in 400 parts of water, the pH is brought to 9.0 with 2N NaOH and 0.4 part of maleic anhydride is added. The mixture is stirred at room temperature for 2 hours and at 40° C. for 0.5 hour. The pH is brought to 2.0 by addition of 2N hydrochloric acid. The black dyestuff which has precipitated is filtered off with suction, washed with water and dried at 80° C. in vacuo. 4.0 parts of a dyestuff according to the invention which, in the form of its free acid, probably corresponds to the following formula

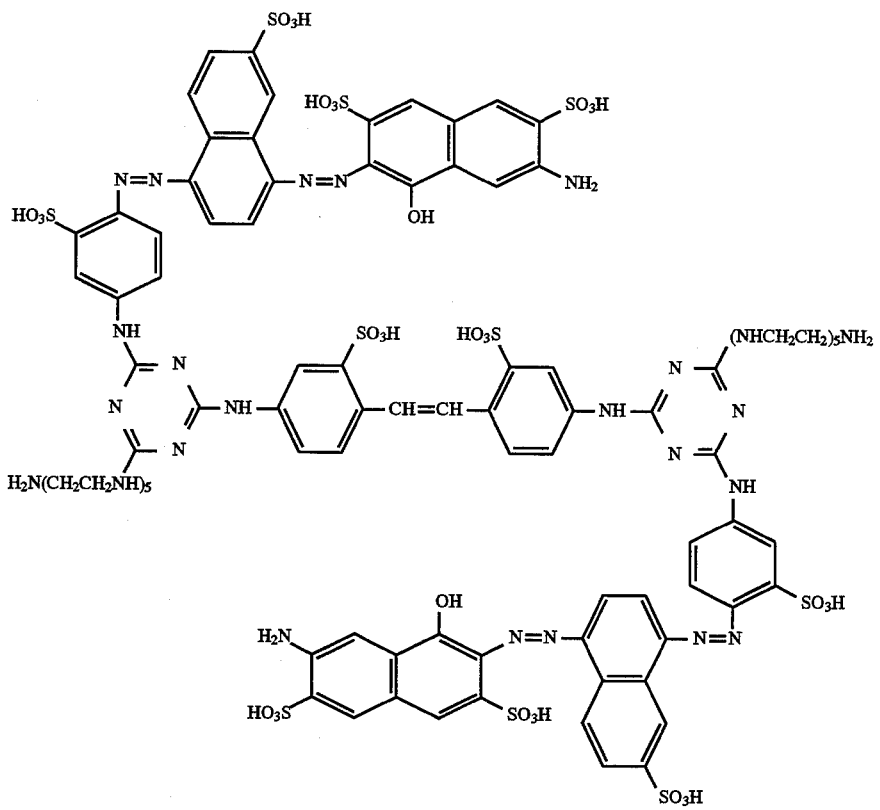

$\lambda_{max}$: 614, 454 nm are obtained.

5 parts of this dyestuff are stirred into 80 parts of water and the pH is brought to 10.0 by addition of 2N sodium

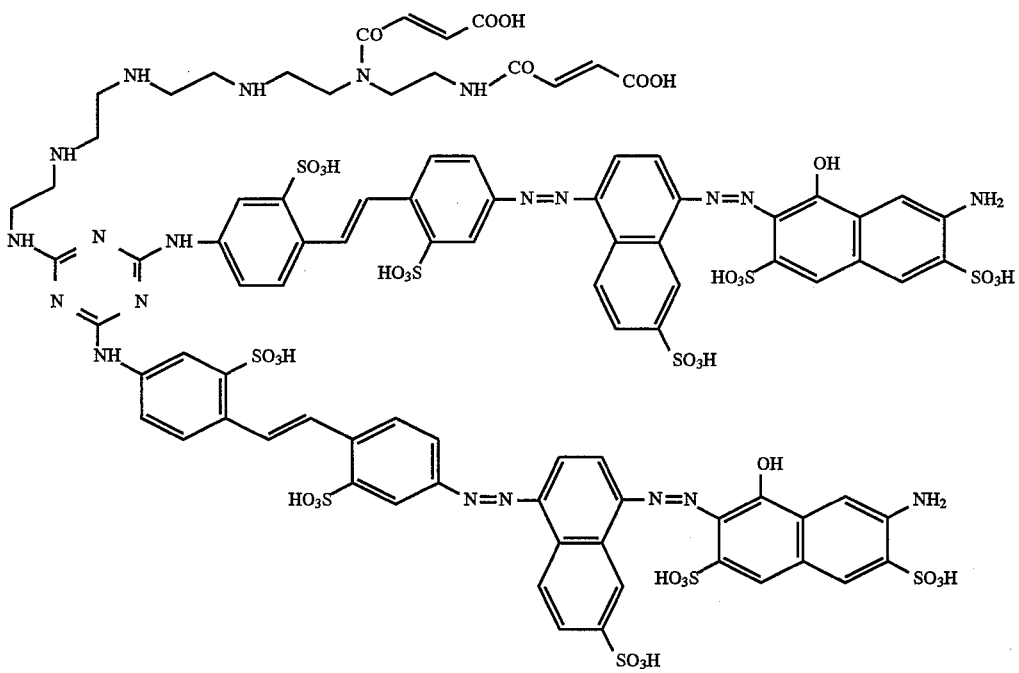

$\lambda_{max}$: 603, 466 nm are obtained.

2.5 parts of this dyestuff are stirred into 40 parts of water and the pH is brought to 9.0 by addition of 2N sodium hydroxide solution. A total weight of 50 parts is established by addition of water, so that an approximately 5% strength liquid finished formulation according to the invention of the above dyestuff is obtained. This can be used for the preparation of a recording liquid according to Example 6, which likewise allows fast black prints.

EXAMPLE 15

1 part of cyanuric chloride is dispersed in 100 parts of water and 50 parts of ice, with addition of 0.1 part of a commercially available emulsifier, and 4.7 parts of dyestuff precursor (B) obtained according to Example 2 are then added. The temperature is allowed to rise to 15° C., while stirring, during which the pH is kept at 3.5–4.0 with 2N sodium hydroxide solution. After addition of a further 4.7 parts of dyestuff precursor (A) obtained according to Example 1, the temperature is increased to 40°–45° C. and the pH to 7.5. After the mixture has been stirred at this temperature and pH 7.0–7.5 for 1 hour, 2.3 parts of pentaethylenehexamine are added. After the mixture has been stirred at this temperature for 2.5 hours and at 60° C. for 0.5 hour, it is allowed to cool to room temperature, the pH is brought to 6.0 with 2N hydrochloric acid and the solid is filtered off with suction, washed with water and dried in vacuo at 80° C. 10.2 parts of a dyestuff according to the invention which, in the form of its free acid, corresponds to the following formula

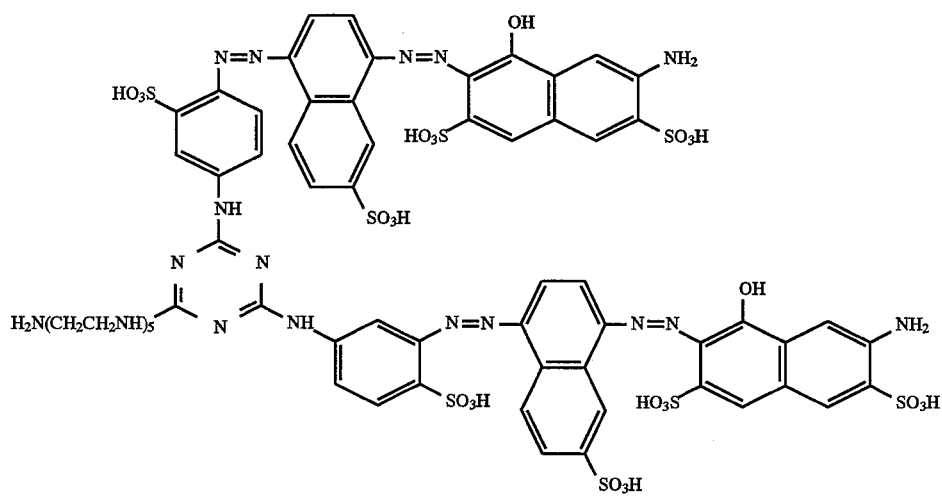

$\lambda_{max}$: 604, 457 nm are obtained.

5 parts of this dyestuff are stirred into 80 parts of water and the pH is brought to 9.5 by addition of 2N sodium hydroxide solution. A total weight of 100 parts is established by addition of water, so that an approximately 5% strength of liquid finished formulation according to the invention of the above dyestuff is obtained.

Black, fast paper dyeings are obtained with this liquid finished formulation by the process described in Example 5. Furthermore, analogous to Example 6, a recording liquid is obtained which allows prints in light- and wet-fast black shades by INKJET printing on customary writing paper.

EXAMPLE 16

If, instead of 4'-acetylamino-4-aminostilbene-2,2'-disulphonic acid, the corresponding 4-amino-4'-acetylaminostilbene-2-sulphonic acid is used in Example 8, dyestuff intermediate (D), which, in the form of the free acid, corresponds to the following formula:

acid. After the mixture has been stirred for 1 hour, the solid is filtered off with suction, washed with water and dried at 80° C. in vacuo. 10.1 parts of a dyestuff according to the invention which, in the form of its free acid, corresponds to the following formula

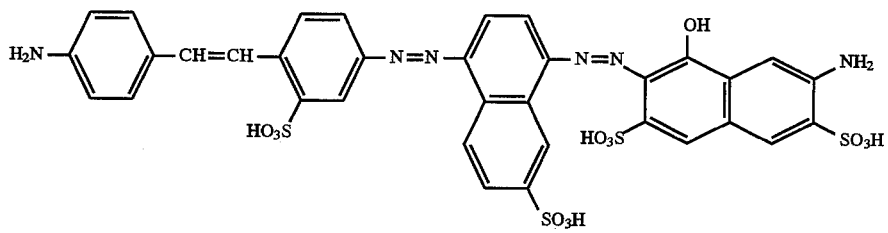

$\lambda_{max}$: 608, 463 nm is obtained.

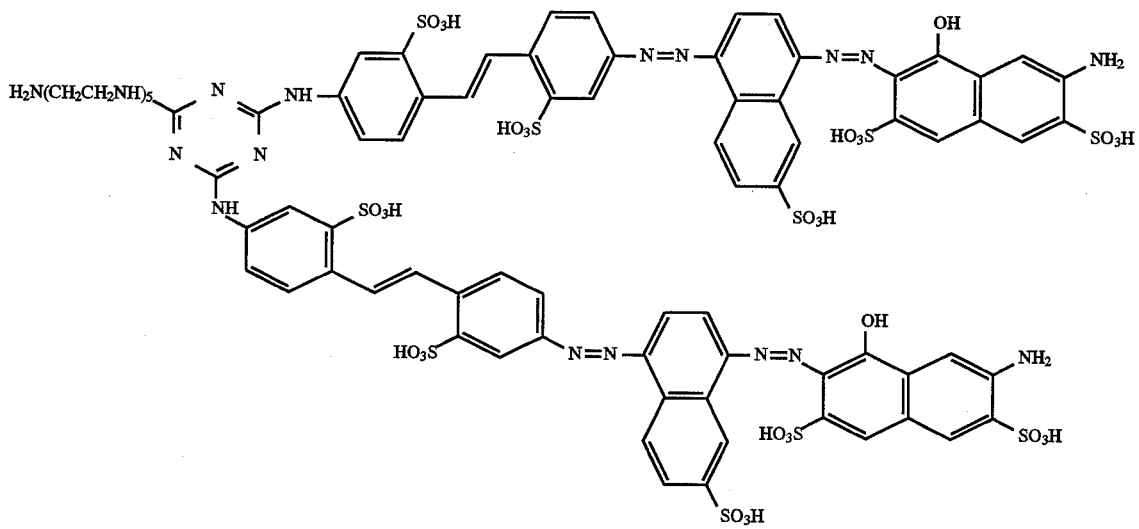

EXAMPLE 17

8.3 parts of dyestuff precursor (D) obtained according to Example 16 (=4.8 parts of salt-free product) are dissolved in 150 parts of water at a pH of 5.0, and 1 part of finely comminuted cyanuric chloride is added. After the mixture has been stirred at room temperature for 0.5 hour, a further 8.3 parts of precursor (D) are added and the pH is increased to 6.5–7.0 with 1N sodium hydroxide solution.

The mixture is heated to 40°–45° C., kept at this temperature for 1 hour and then stirred at 60° C. for a further 0.5 hour. 3.5 parts of pentaethylenetetramine are added and the temperature is increased to 80° C. After a further 0.5 hour, the mixture is cooled to room temperature and the pH is brought to 7.0 by addition of 30% strength hydrochloric $\lambda_{max}$: 605, 463 nm are obtained.

5 parts of this dyestuff are stirred into 80 parts of water and the pH is brought to 10.0 by addition of 2N sodium hydroxide solution. A total weight of 100 parts is established by addition of water, so that an approximately 5% strength liquid finished formulation according to the invention of the above dyestuff is obtained. This can be used analogously to Example 4 for the preparation of recording liquids according to Example 6, which likewise allow very fast black prints.

If the 3.5 parts of pentaethylenehexamine in the above example are replaced by 1.5 parts of triethylenetetramine, a dyestuff having comparable properties is obtained.

EXAMPLE 18

4.0 parts of the dyestuff obtained according to Example 17 are reacted with 0.4 part of maleic anhydride analogously to Example 14.

4.0 parts of a dyestuff according to the invention which, in the form of its free acid, probably corresponds to the following formula

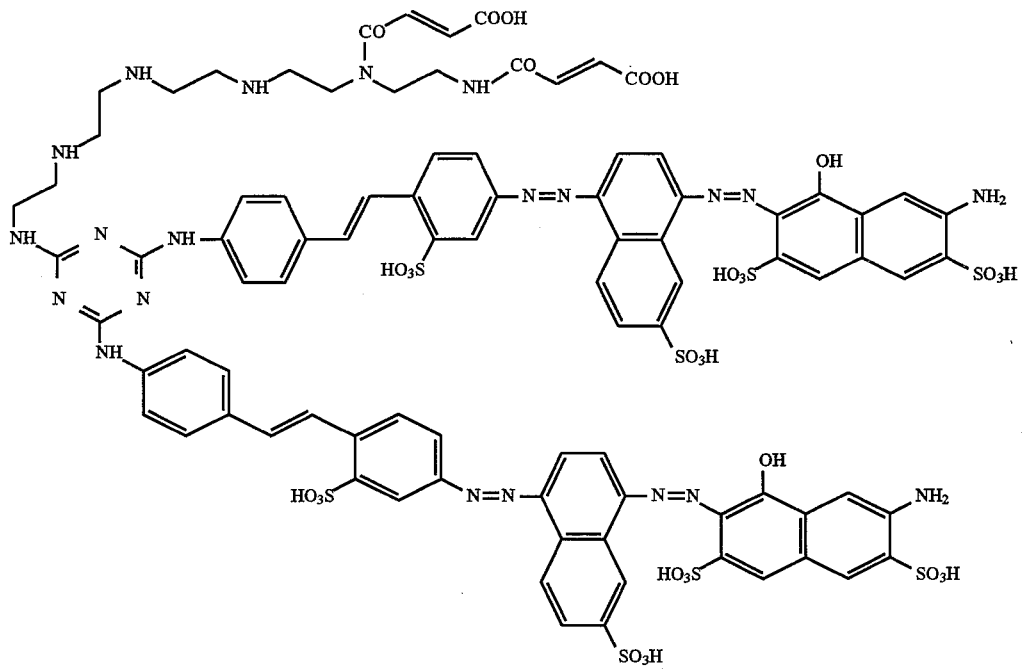

$\lambda_{max}$: 606, 460 nm are obtained.

2.5 parts of this dyestuff are stirred into 40 parts of water and the pH is brought to 9.0 by addition of 2N sodium hydroxide solution. A total weight of 50 parts is established by addition of water, so that an approximately 5% strength liquid finished formulation according to the invention of the above dyestuff is obtained. This can be used for the preparation of a recording liquid according to Example 6, which likewise allows fast black prints.

What is claimed is:

1. A dyestuff of the formula (I)

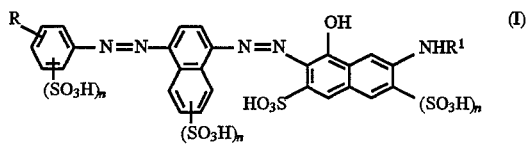

wherein

R represents NHR$^2$, —CH=CH—R$^3$, —CH$_2$—CH$_2$—R$^3$ or

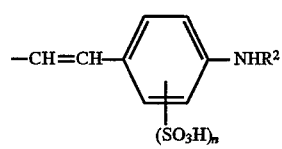

R$^1$ represents hydrogen, unsubstituted or substituted C$_1$–C$_4$ alkyl, unsubstituted or substituted C$_1$–C$_4$ alkylcarbonyl, unsubstituted or substituted phenyl or unsubstituted or substituted phenylcarbonyl, R$^2$ represents —W—NHR$^3$ wherein W represents a bridge member, R$^3$ represents

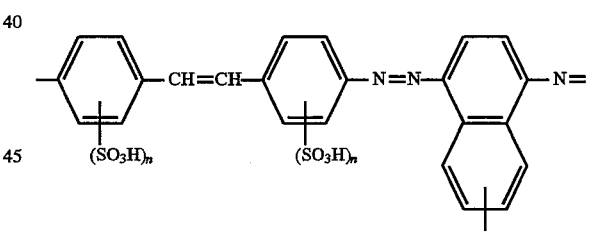

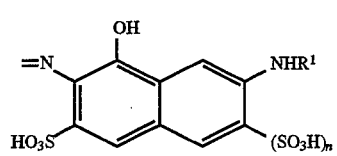

and n represents, in each case independently of one another, 0 or 1.

2. A dyestuff of claim 1, wherein

W represents

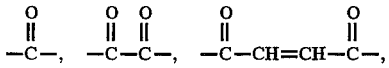

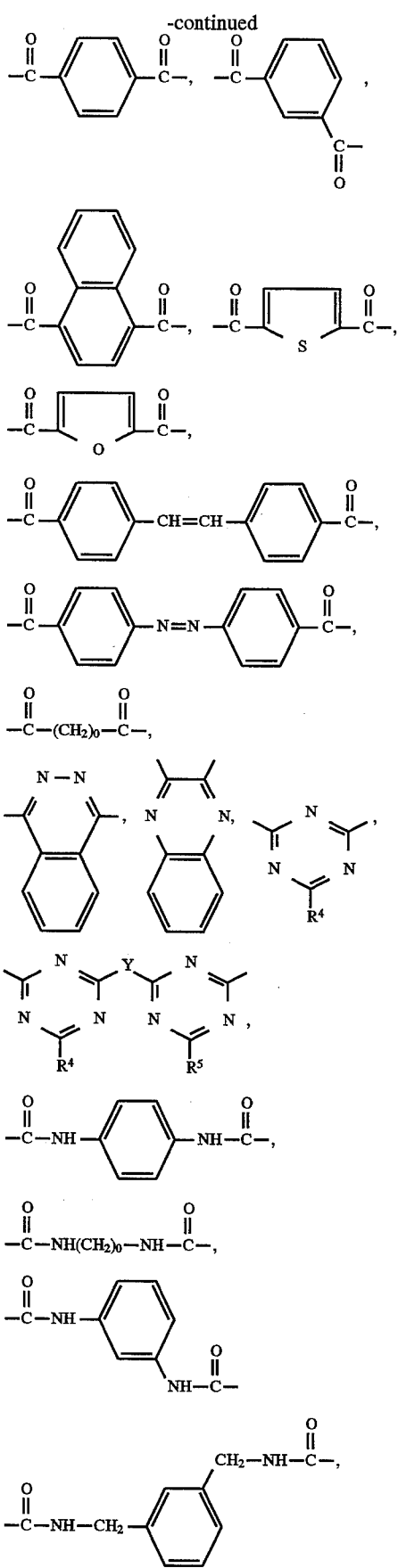
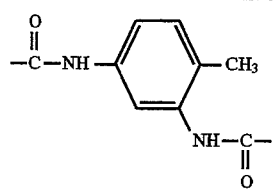
wherein
$R^4$ and $R^5$ independently of one another represent halogen, hydroxyl, $C_1$–$C_6$-alkoxy, $C_1$–$C_6$-alkyl or an unsubstituted or substituted amino group, and
o represents 1 to 6 and
Y represents
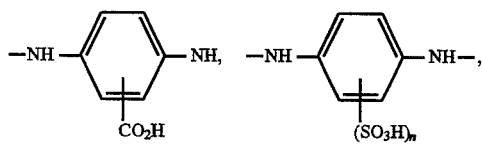
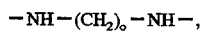
—NH—(CH$_2$)$_o$—NH—,
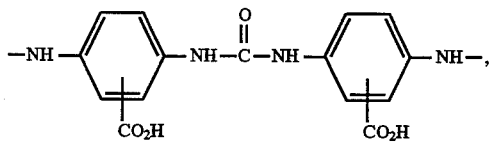
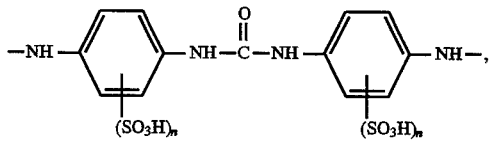
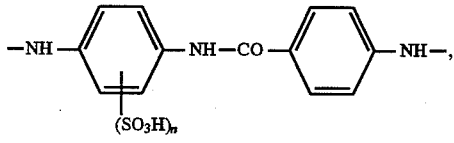
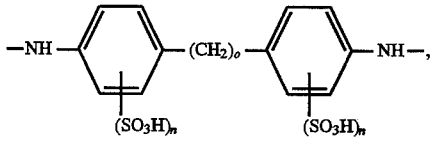
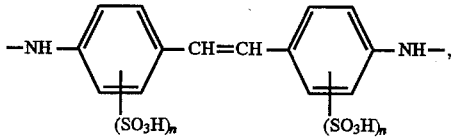
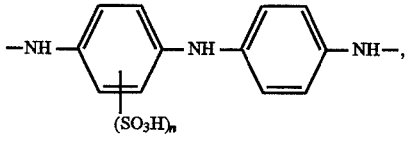
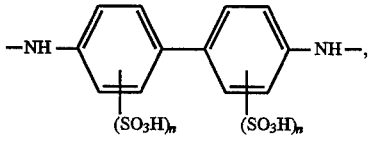

35

-continued

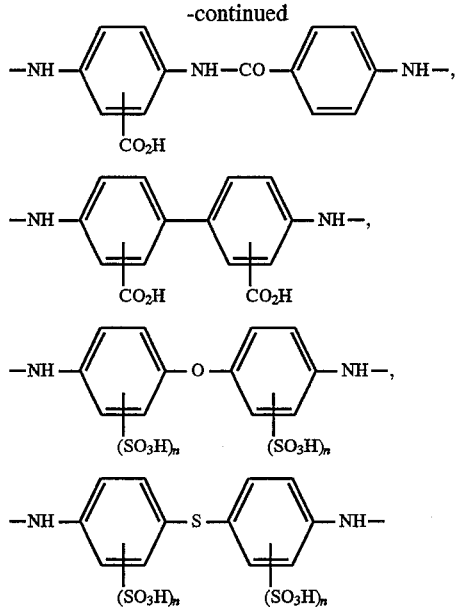

wherein
o represents 1 to 6 and
n represents, in each case independently of one another, 0 or 1.

3. A dyestuff according to claim 1, wherein
$R^4$ and $R^5$ independently of one another represent halogen, or an unsubstituted or substituted amino group of the formula

—$NR^7R^8$, wherein
$R^7$ and $R^8$ independently of one another represent hydrogen or an aliphatic, aromatic, araliphatic or cycloaliphatic radical,
$R^8$ furthermore also represents hydroxyl, $C_1$–$C_4$-alkoxy, amino, phenylamino or $C_1$–$C_4$-alkoxyamino, or
$R^7$ and $R^8$ together with the nitrogen atom to which they are bonded, form a 3- to 8-membered saturated or unsaturated ring which contains 0–2 heteroatoms from the series consisting of oxygen, sulphur and nitrogen and is unsubstituted or substituted by $C_1$–$C_4$-alkyl, $C_1$–$C_4$-hydroxylalkyl or $C_1$–$C_4$-aminoalkyl.

4. A dyestuff according to claim 1, wherein
R represents $NHR^2$, —CH=CH—$R^3$, —$CH_2$—$CH_2$—$R^3$ or

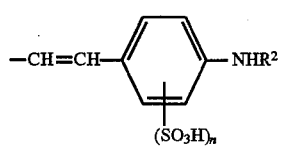

$R^1$ represents H, $CH_3$, $C_2H_4OH$, $C_2H_4NH_2$, phenyl, 3- or 4-sulphophenyl, 3- or 4- carboxyphenyl, acetyl, propionyl, benzoyl or maleinyl,

36

W represents a radical of the formula

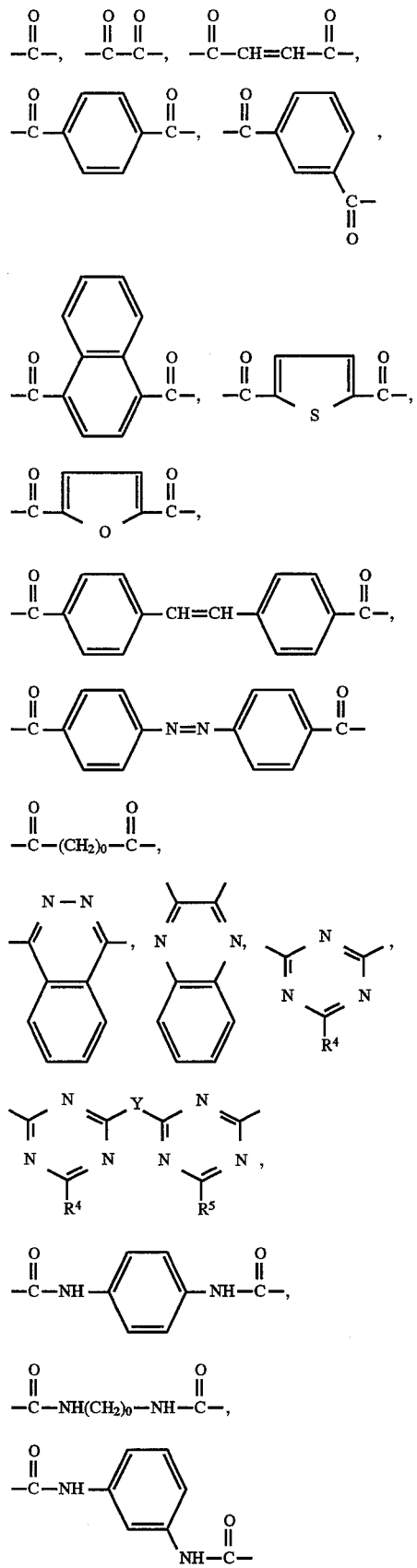

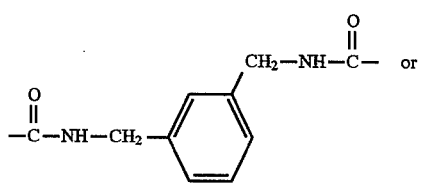

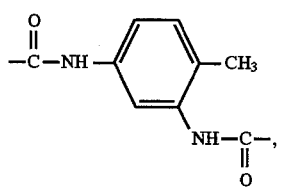

wherein
o represents 1 to 6,
Y represents a radical of the formula

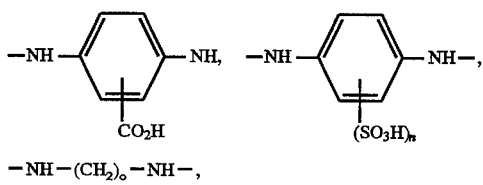

−NH−(CH$_2$)$_o$−NH−,

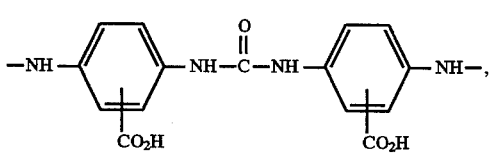

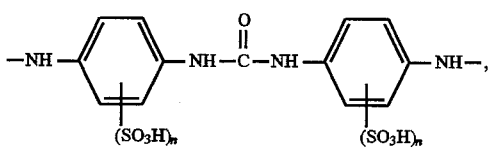

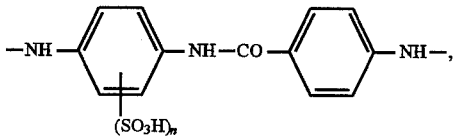

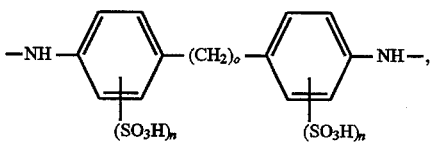

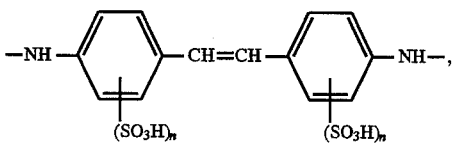

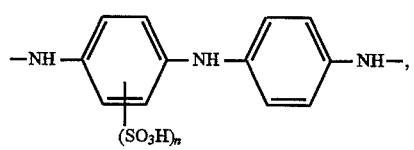

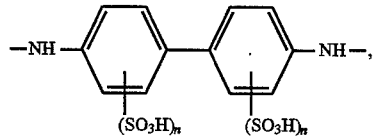

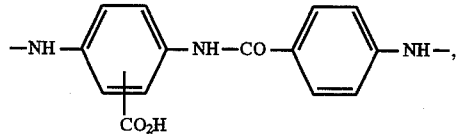

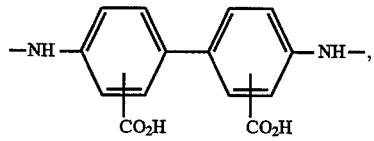

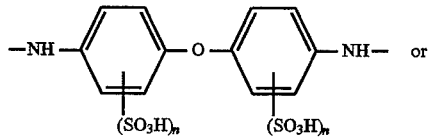

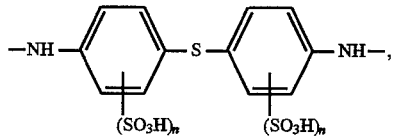

wherein o represents 1 to 6 and n represents, in each case independently of one another, 0 or 1, and the sum of all the n is ≧2, and $R^4$ and $R^5$ independently of one another represent fluorine, chlorine, bromine or an unsubstituted or substituted amino group of the formula $NR^7R^8$ wherein $R^7$ and $R^8$ independently of one another represent hydrogen, or represent $C_1$–$C_6$-alkyl which is unsubstituted or substituted by carboxyl, hydroxyl, $C_1$–$C_4$-alkoxy, amino or sulpho, or represent phenyl-$C_1$–$C_4$-alkyl, $R^8$ furthermore represents ethyl which is substituted by a polyalkylene-polyamine radical, or $R^7$ and $R^8$ together with the nitrogen atom to which they are bonded, form a saturated 5- or 6-membered ring, which contains 0–1 oxygen or nitrogen atoms and which is unsubstituted or substituted by $C_1$–$C_4$-alkyl, $C_1$–$C_4$-hydroxyalkyl or $C_1$–$C_4$-aminoalkyl.

5. A dyestuff of claim 1, wherein

W represents

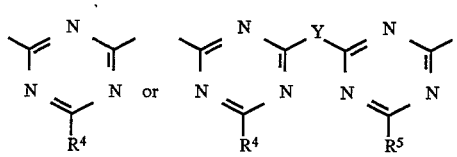 or 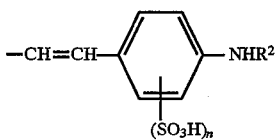

and

Y represents

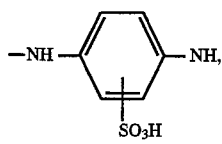

NH—(CH$_2$)$_o$—NH or

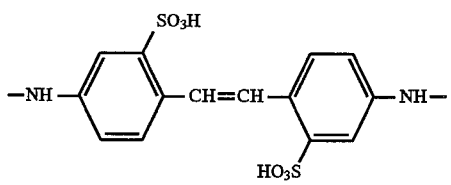

wherein o represents 1 to 6, and wherein $R^4$ and $R^5$ independently of one another represent halogen, hydroxyl, $C_1$–$C_6$-alkoxy, $C_1$–$C_6$-alkyl or an unsubstituted or substituted amino group.

6. A dyestuff according to claim 3, wherein $R^7$ and $R^8$, together with the nitrogen atom to which they are bonded, form a 5- to 7-membered saturated or unsaturated ring which contains 0–2 heteroatoms from the series consisting of oxygen, sulphur and nitrogen and is unsubstituted or substituted by $C_1$–$C_4$-alkyl, $C_1$–$C_4$-hydroxylalkyl or $C_1$–$C_4$-aminoalkyl.

7. Process for the preparation of the dyestuffs according to claim 1

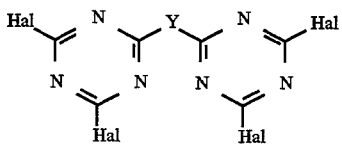

where R=NHR$^2$ and by reaction of the colour base of the formula (IIa) or (IIb)

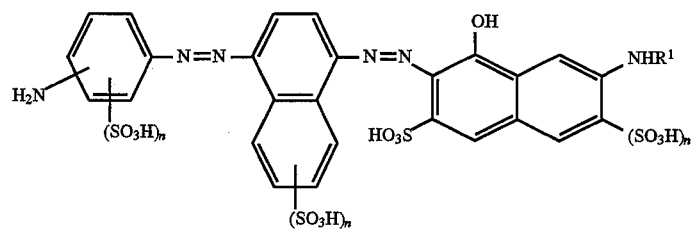 (IIa)

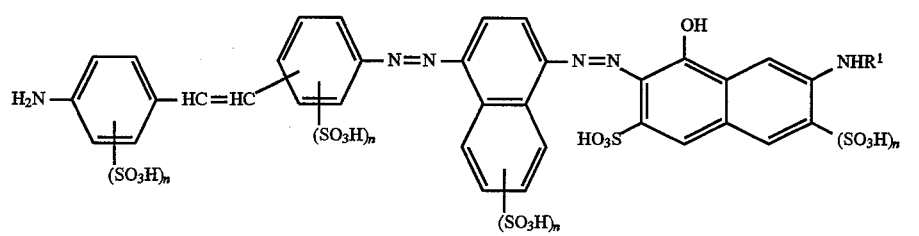 (IIb)

wherein n and $R^1$ have the meaning given in claim 1, with a compound of the formula Hal—W—NHR$^3$ or (III)

(IV)

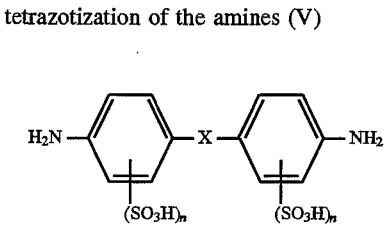

wherein Hal represents chlorine, bromine or fluorine and $R^3$, W and Y have the meaning given in claim 1.

8. Process for the preparation of the dyestuffs according to claim 1 where R=—CH=CH—R$^3$ and CH$_2$—CH$_2$—R$^3$, by tetrazotization of the amines (V)

(V)

wherein n represents, in each case independently of one another, 0 or 1 and

X represents —CH=CH— or —CH₂—CH₂—,
and coupling of the tetrazotization product to compounds (VI)
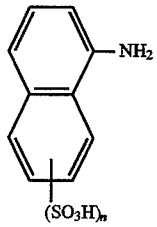  (VI)
wherein n represents 0 or 1,
and subsequent further tetrazotization and coupling to (VII)
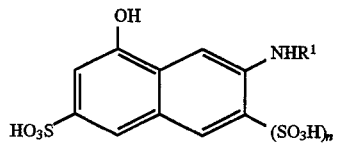  (VII)
wherein n and R¹ have the meaning given in claim 1.
* * * * *